Figure 1:
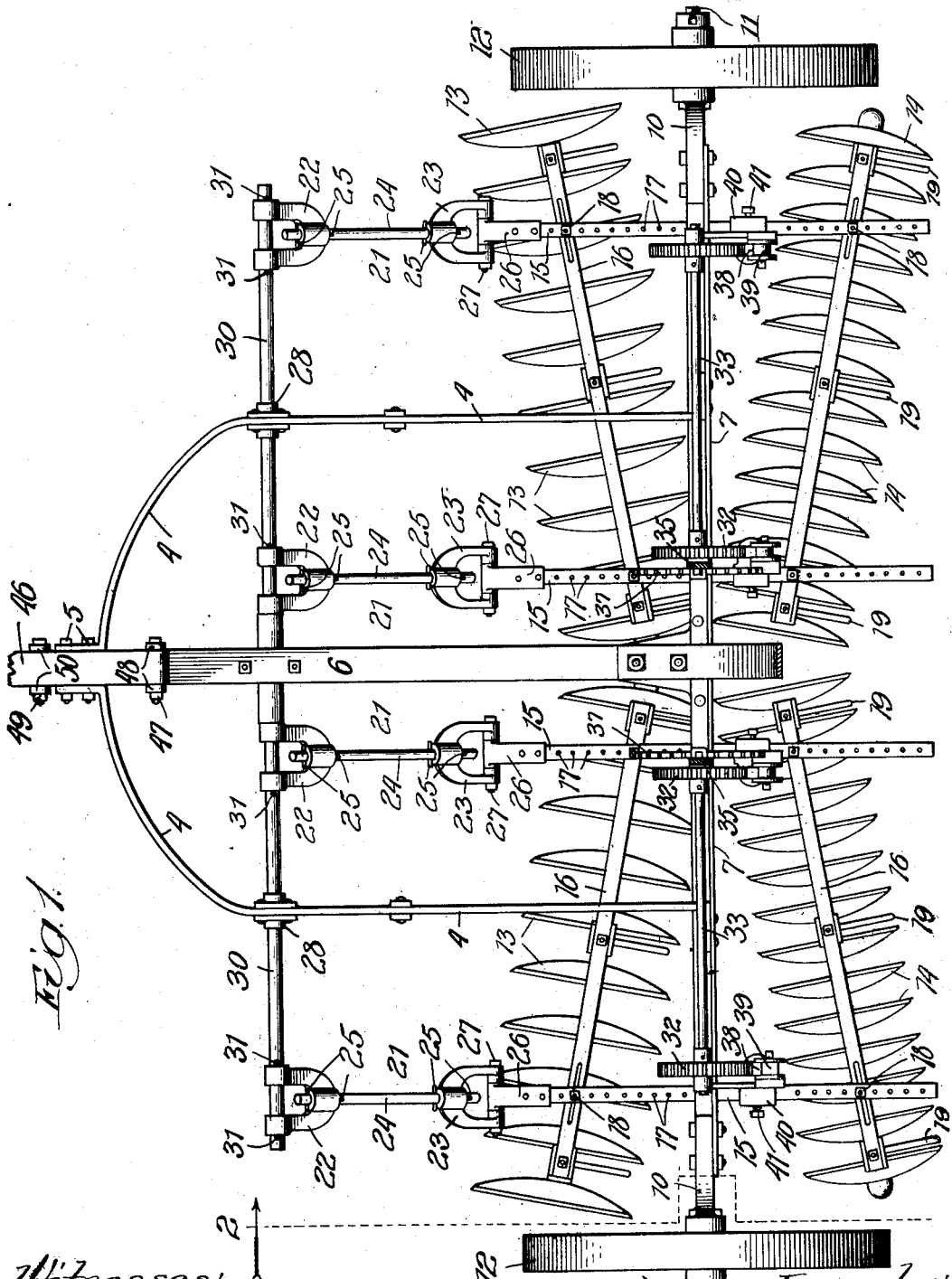

E. M. KRAMER.
AGRICULTURAL MACHINE.
APPLICATION FILED JUNE 18, 1912.

1,115,839.

Patented Nov. 3, 1914.
3 SHEETS—SHEET 1.

Witnesses:
Inventor:
Emil M. Kramer

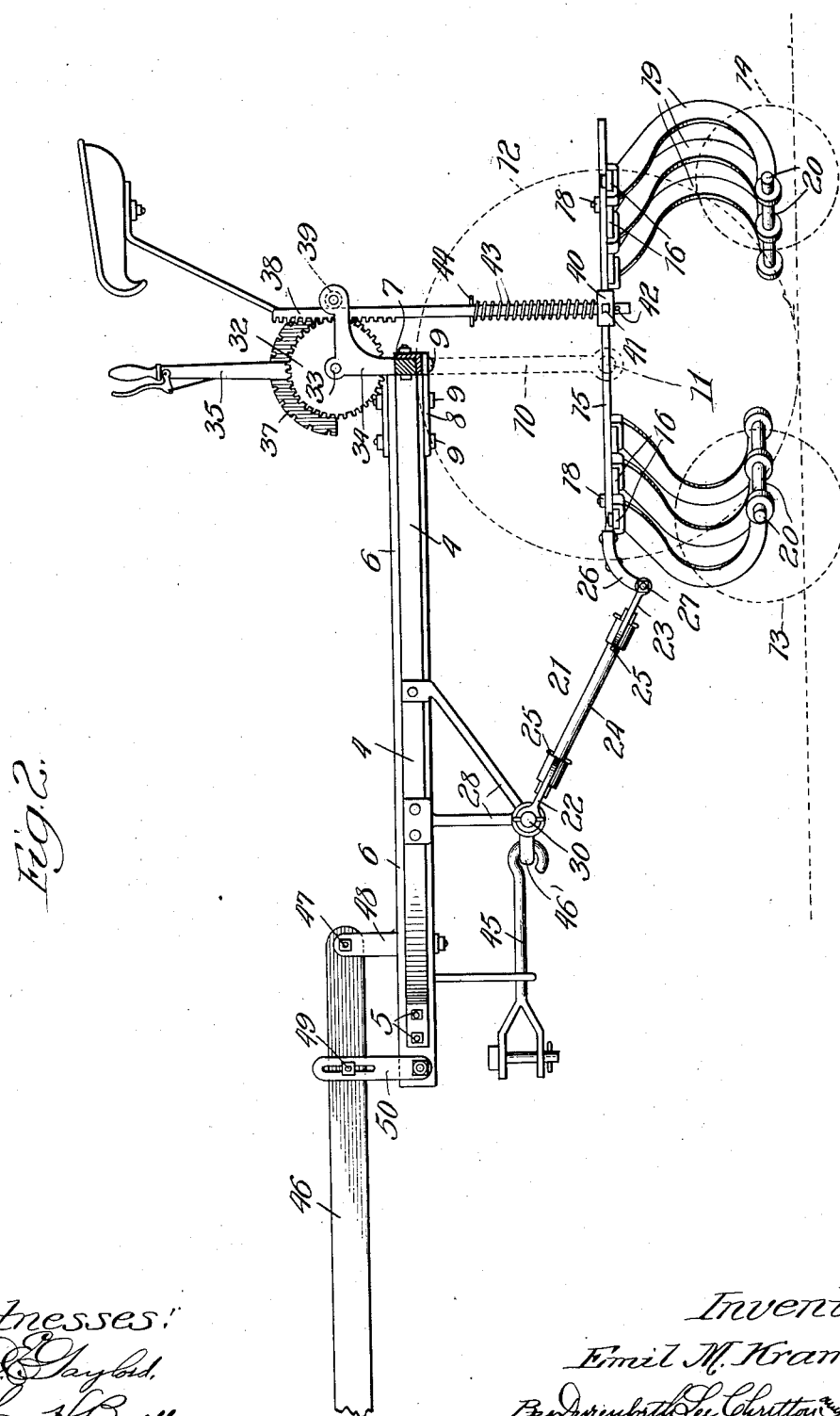

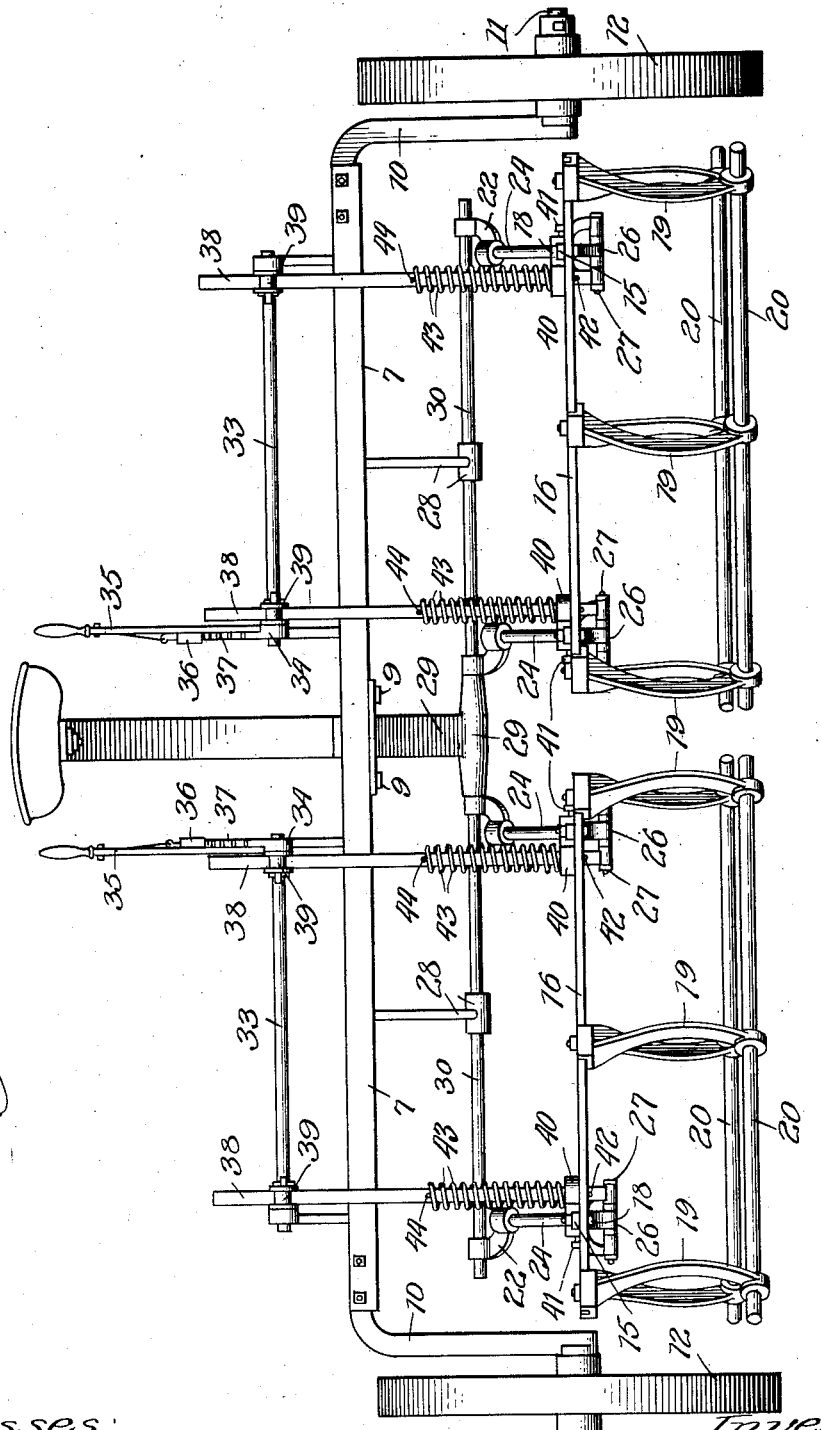

UNITED STATES PATENT OFFICE.

EMIL M. KRAMER, OF PAXTON, ILLINOIS.

AGRICULTURAL MACHINE.

1,115,839.   Specification of Letters Patent.   Patented Nov. 3, 1914.

Application filed June 18, 1912. Serial No. 704,446.

*To all whom it may concern:*

Be it known that I, EMIL M. KRAMER, a citizen of the United States, residing at Paxton, in the county of Ford and State of Illinois, have invented a new and useful Improvement in Agricultural Machines, of which the following is a specification.

My invention relates more particularly to machines for turning over and pulverizing the ground, commonly known as pulverizers, and in its preferred embodiment being in the form of a combined pulverizer and harrow designed to turn over and break up the ground and leave it in level condition, though as will be manifest from the following description, it may be in the form of either a so-called pulverizer or harrow, as desired.

The condition of the ground to be worked varies to a great extent, depending upon its location and the condition of the weather, and in order that a machine for the above stated purpose operate with uniform effectiveness upon the ground, it is necessary that it be so constructed that it will operate equally well upon both the soft and the relatively hard soil.

All of the machines of the character above stated as hitherto provided, so far as I am aware, have been so constructed that the entire weight of the machine at all times is exerted against the pulverizer devices, which generally are in the form of disks, and because of this fact the machines are generally provided of a weight which is sufficient to cause the disks, or the like, when the latter are positioned at the proper angle for turning over the soil, to penetrate into the latter, when in relatively soft condition, sufficiently far to turn over the soil to the desired depth; and when the machine is used on relatively hard soil, it is designed that either more weight be added to the machine to cause the disks to penetrate to the desired depth without changing the angle at which they extend, or else to reset the disks to cause them to extend at a greater angle relative to the path through which the machine moves for drawing the disks into the ground. Machines so constructed present a number of disadvantages, chiefly among which are the following: In running the machine from soft to hard ground, it is necessary either that more weight be added thereto, as by piling stones, sand, or the like, onto the machine to cause the disks to penetrate the relatively hard ground to the desired depth without changing the angle at which the disks extend, or that the disks be so adjusted that they extend at a greater angle to the line of movement of the machine. The changing of the weight of the machine, it will be understood, is not only a tedious operation but one which is wasteful of time, especially where the condition of the ground, as to its hardness, is constantly varying. If the operator, in lieu of varying the weight of the machine, changes the angle of the disks to suit the varying conditions of the ground, this is likewise objectionable, as in traveling through the hard ground the resistance of the machine and the wear of the disks is enormously increased, and should the machine be driven through soft ground when the disks are so set, the soil will be piled up into objectionable ridges. Furthermore, as the entire weight of the machine is supported on the disks, when the ground is unduly soft the disks, if set to turn the soil, will penetrate the ground to such an extent that relatively high ridges will be formed, thus leaving the ground in an obpectionable condition. Another objection due to the necessity of turning the disks at an angle to the line of movement of the machine greater than that required for working soft ground in machines as hitherto constructed, is that of the soil becoming packed on the disks, with the manifest disadvantage of impairing their efficiency. Still another disadvantage of machines as hitherto constructed is that in traveling over uneven ground, the disks do not penetrate the ground uniformly, but cut through the higher portions thereof, and often leave the depressed portions unaffected, this being due to the inflexible condition of the machine, which is an objection, as it is desired that the ground be worked to as nearly a uniform degree as possible. Still another objection to machines as hitherto constructed, due to the fact that the machines are supported at all times wholly on the disks, or the like, is that it is impossible to make short turns in the field without danger of breaking the pulverizing devices and impossible to move the machine from one point to another, as for example, from one field or section thereof to another, without cutting up the ground over which the machine passed unless it be loaded upon a wagon and conveyed in this manner to the place where it is to be used.

My object is to provide a machine in which the above stated objections are overcome, and to this end I provide a machine, generally stated, equipped with wheel supports upon which the machine is adapted to travel over the field and wherein adjustment of the pulverizing devices is rendered unnecessary after initial adjustment, in operating upon ground of varying degrees of hardness, thereby avoiding the necessity of adding to or subtracting weight from the machine as it operates through ground of varying hardness, preventing objectionable ridging of the ground and non-uniform penetration of the pulverizing devices into the latter.

Other objects are to provide a machine which will not present undue resistance to its being drawn over the ground whereby it may be operated with the minimum amount of power, which will prevent undue wear of the pulverizing devices, and by which packing of the soil thereon will be avoided; to provide for substantially uniform penetration of the harrowing devices into the ground, regardless of the uneven condition thereof; to provide for the proper pulverization of the ground and leave it in substantially level condition; and generally, to so improve upon machines of the character stated as will cause them to better perform the functions for which they are intended.

Referring to the accompanying drawings wherein I have illustrated the preferred embodiment of my invention, Figure 1 is a plan view of the machine. Fig. 2 is a section taken at the line 2 on Fig. 1 and viewed in the direction of the arrow, the pulverizing and harrowing devices and one of the wheels being shown diagrammatically; and Fig. 3 is a view in end elevation of the machine, with the pulverizing and harrowing devices omitted.

The frame of the machine comprises a yoke member 4 formed of two sections bolted, as indicated at 5, at their forward ends, to a beam 6; and a cross-bar 7 formed of angle-iron secured intermediate its ends to the rear end of the beam 6 through the medium of a plate 8 secured, as by bolts 9, to the beam 6 and bar 7, said bar being provided at its ends with downwardly-extending sections 10, terminating in stub-axles 11 on which wheels 12, at which the machine is adapted to be supported and rolled over the ground, are journaled.

The pulverizing and harrowing devices which, in the construction illustrated, are of the commonly employed dished form, though it will be understood that any other suitable form of device for this purpose may be employed, are represented at 13 and 14 and are supported in pairs, as hereinafter described, on frames arranged at opposite sides of the machine and formed of longitudinally-extending bars 15 spaced apart and connected together by cross-bars 16, the bars 15 containing openings 17 adapted to receive bolts 18 which pass through the ends of the bars 16 and through the medium of which the bars 16 are adapted to be secured in any desired position of angular adjustment relative to the line of travel of the machine. The cross-bars 16 are provided at intervals with depending arms 19 in which shafts 20 on which the disks 13 and 14 are secured, are journaled.

The frames just described are connected at the front ends of the bars 15 with the main frame of the machine through the medium of connectors 21, which are preferably formed of yoke members 22 and 23 journaled on the opposite ends of rods 24 and held thereon by stop-pins 25, the yokes 23 being pivotally connected with brackets 26 on the forward ends of the bars 15, as represented at 27. The yoke 4 and the beam 6 are provided with depending brackets 28 and 29, respectively in which a bar 30 is fixed, the yokes 22 of the couplers 21 being pivotally connected with said bar, as represented in Fig. 1, and held thereon by stop-pins 31.

Each of the disk-equipped frames is adapted to be adjusted vertically, as desired, through the medium of gears 32 fixed on shafts 33 journaled in upwardly-extending brackets 34 secured to the frame of the machine, each of the shafts 33 being provided with an operating lever 35 having a manually-controlled pawl 36 engaging with a quadrant 37 secured to the adjacent bracket 34. The gears 32 mesh with rack-bars 38 held in engagement with said gears by means of rollers 39 on the brackets 34, and extending downwardly through blocks 40 carried by the bars 15 and adapted to be adjustably secured thereon, as through the medium of set-screws 41. The rods 38, below the blocks 40, are provided with cross-pins 42 whereby when said rods are raised by turning the gears 32 to the left in Fig. 2, the frames carrying the disks 13 and 14 will be lifted, a coil-spring 43 surrounding each of the rods 38 and being confined thereon under tension between stops 44 on said rods and the upper surface of the blocks 40, for the purpose hereinafter described.

In operating my improved machine, the disks 13 and 14 are adjusted at the bolts 18 to set them at the desired angle for turning the soil, and the frames carrying them adjusted vertically through the medium of the levers 35 to cause the disks 13 and 14 to penetrate the ground to the desired depth. As the machine moves over the ground, the 13 weight thereof is supported to a greater or less extent upon the wheels 12, depending upon the hardness of the ground being traversed. As the machine travels over soft ground, the resistance thereof to the sinking of the disks 13 and 14 into the ground will be reduced and thus the wheels 12 will support a greater proportion of the load, whereas when the disks are traveling through harder ground, the weight upon the wheels 12 will be reduced. It will thus be understood that in operating my improved machine the weight thereof need not be varied for operating upon soil of varying hardness, as explained above of prior machines, nor is it necessary that the disks 13 and 14, when once set at the desired angle, be readjusted, so that the operator may run the machine over ground of varying hardness and turn all of the soil to the desired uniform depth without objectionable ridging thereof.

In the preferred embodiment of my invention illustrated, the disks 13 are designed to perform the hardest part of the work and the disks 14 to further pulverize and level the ground; and in order that the degree of penetration of the disks 13 and 14 relative to each other be regulated to suit varying conditions, I provide the adjustable blocks 40, which may be adjusted along the bars 15, the springs 43 serving to force the disk-carrying frames downward. Thus, if it is desired that the disks 13 and 14 bear with the same downward pressure against the soil, the blocks 40 will be adjusted to cause them to substantially aline with the stub-axles 11, or if greater downward pressure is to be produced by either the disks 13 or 14, these blocks will be adjusted to one side or the other of said last referred to position, as will be readily understood.

It will be understood from the foregoing description that the frames carrying the disks 13 and 14 are so connected with the machine that they are free to tilt in any direction as they are traveling over the ground, the springs 43 by being positioned toward opposite ends of the frames serving to force the disks 13 and 14 into the depressed portions of the ground, and thus as the machine travels over the ground, the disks 13 and 14 will penetrate the latter to a substantially uniform degree regardless of the rolling condition of the ground.

In operating upon soil not required to lie in turned condition for a considerable length of time before planting, I prefer to position the disks 14 as represented in Fig. 1, namely, to cause them to extend at an angle opposite to that at which the disks 13 extend, and thus the relatively small ridges produced by the operation of the disks 13 upon the soil are acted upon by the disks 14 which serve to throw the ground in the opposite direction and thus level it. Where, however, it is desired that the ground lie in turned condition for a time before planting, the disks 14 would preferably be so adjusted on the bars 15, by transposing the cross-bars 16 carrying them, as to cause these bars to extend substantially parallel with the bars 16 on which the disks 13 are supported, which would cause the ground to be turned in the same direction by both the front and rear disks, and upon again running the machine over the ground, the ridges formed by the operation just stated will be cut away and the ground leveled. The above-described adjustment of the disks 14 in the construction illustrated may be readily effected, as the cross-bars 16 are readily interchangeable and may be used at either side of the machine as desired.

In order that the point of draft of the machine may be placed as low as possible and the machine be accommodated to draft horses of different heights, I attach the clevis, represented at 45, to an eye 46' carried on the lower end of the bracket 29, and provide an adjustable tongue 46. The tongue 46 is pivotally connected at its rear end, as indicated at 47, to the upper end of a post 48 carried by the beam 6, and is adjustably connected, as indicated at 49, forward of the pivot 47, on the post 50. It will thus be understood that by this arrangement the point of draft is sufficiently low for producing the best results and the tongue 46 may be adjusted up or down to suit horses of different heights and overcome any tendency to tilting of the machine backward.

While I have illustrated and described my invention as embodied in a machine employing disks arranged in tandem, for the purpose above stated, it will be understood that my invention may be embodied in a machine in which single sets of disks are employed or in a machine wherein more sets thereof than those illustrated, are used. Furthermore, I do not wish to be understood as intending to limit my invention to a machine wherein rotatable pulverizing, or the like, devices are employed of whatsoever construction, as it is equally useful in connection with machines employing other forms of pulverizing devices.

By using the term "pulverizing devices" in the claims, I do not wish to be understood as intending to limit my invention to what are oftentimes specifically termed "pulverizing devices", but desire to be understood as intending to claim any device which serves to turn over and thus work the soil.

What I claim as new and desire to secure by Letters Patent is—

1. In a pulverizing machine, the combination of a main frame provided with wheels, supplemental frames arranged below and at opposite sides of the central line of said main frame, said supplemental frames connected with said main frame and each including forward and rearward cross-bars adjustably and removably connected with said supplemental frames and interchangeable with the corresponding bars at opposite sides of the machine, and pulverizing devices carried by said cross-bars.

2. In a pulverizing machine, the combination of a main frame provided with wheels, a supplemental frame equipped with sets of pulverizing devices arranged one in front of the other, connectors for connecting said supplemental frame with said main frame, said connectors being located toward opposite sides of said supplemental frame and each journaled horizontally at one end to said main frame and at its opposite end to said supplemental frame and having swiveled sections swiveled on axes at angles to the axes upon which said connectors are journaled, blocks connected with said supplemental frame between said sets of pulverizing devices and adjustable on said frame longitudinally of the machine, and containing openings, rods extending into and slidable in said openings and provided with rack teeth on their upper ends, stops on said rods above and below said blocks, springs encircling said rods and confined between said blocks and the upper ends of said stops, rotatably mounted gears meshing with the teeth on said rods, means for actuating said gears, and means for holding said gears in mesh with the teeth on said rods.

EMIL M. KRAMER.

In the presence of—
 NELLIE B. DEARBORN,
 RALPH A. SCHAEFER.